(12) United States Patent
Cook et al.

(10) Patent No.: US 11,029,228 B2
(45) Date of Patent: Jun. 8, 2021

(54) WHEEL FORCE TRANSDUCER STATOR ANGLE CORRECTION DEVICE

(71) Applicant: Michigan Scientific Corporation, Milford, MI (US)

(72) Inventors: Andrew Cook, New Hudson, MI (US); Daniel Wheeler, Milford, MI (US); Stephan Barthel, Farmington, MI (US)

(73) Assignee: Michigan Scientific Corporation, Milford, MI (US)

( * ) Notice: Subject to any disclaimer, the term of this patent is extended or adjusted under 35 U.S.C. 154(b) by 322 days.

(21) Appl. No.: 15/997,253

(22) Filed: Jun. 4, 2018

(65) Prior Publication Data

US 2019/0368960 A1 Dec. 5, 2019

(51) Int. Cl.
  *G01L 25/00* (2006.01)
  *G01L 5/16* (2020.01)
  *G01M 17/013* (2006.01)

(52) U.S. Cl.
  CPC ............... *G01L 25/00* (2013.01); *G01L 5/16* (2013.01); *G01M 17/013* (2013.01)

(58) Field of Classification Search
  CPC ......... G01L 5/16; G01L 25/00; G01M 17/013
  See application file for complete search history.

(56) References Cited

U.S. PATENT DOCUMENTS 9,476,800 B2 * 10/2016 Olesky .................. G01B 5/255

FOREIGN PATENT DOCUMENTS

KR 10-2011-0103233 * 9/2011 ............... G01B 5/10

* cited by examiner

*Primary Examiner* — Daniel S Larkin
(74) *Attorney, Agent, or Firm* — Young Basile Hanlon & MacFarlane, P.C.

(57) ABSTRACT

A wheel force transducer stator angle correction apparatus. The apparatus includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer. The apparatus also includes an encoder rigidly attached to a portion of a vehicle associated with the wheel, wherein the encoder is adapted to measure an angle of the stator rod and to adjust at least one value associated with a wheel speed of the wheel based on the measured angle of the stator rod.

19 Claims, 9 Drawing Sheets

WHEEL FORCE TRANSDUCER STATOR ANGLE CORRECTION DEVICE

TECHNICAL FIELD

This disclosure relates to wheel force transducers and in particular to wheel force transducer stator angle correction devices.

BACKGROUND

Wheel force transducers (WFT), together with appropriate instrumentation, are used to measure forces or loads imparted on an associate rotatable member, such as a vehicle wheel, by the road during vehicle durability testing. A WFT system typically includes a 6-axis rotating transducer, a means for communicating signals from rotating to stationary, and a high resolution rotary encoder which is comprised of a rotating component and a non-rotating component. The non-rotating component may be referred to as the encoder stator. The WFT system also includes a User Interface controller that performs coordinate transformation and allows an operator to communicate with the transducer.

SUMMARY

Disclosed herein are aspects, features, elements, implementations, and embodiments of six-axis load cells.

An aspect of the disclosed embodiments is a wheel force transducer stator angle correction apparatus. The apparatus includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer. The apparatus also includes an encoder rigidly attached to a portion of a vehicle associated with the wheel, wherein the encoder is adapted to measure an angle of the stator rod and to adjust at least one value associated with a wheel speed of the wheel based on the measured angle of the stator rod.

Another aspect of the disclosed embodiments is a wheel force transducer stator angle correction system. The system includes a load transducer adapted to measure at least one force acting on a corresponding wheel. The system also includes an encoder stator substantially vertically positioned and rigidly disposed proximate the load transducer. The system also includes a first rotary encoder rotatably attached to the wheel and adapted to measure at least one rotational position of the wheel using the encoder stator. The system also includes a stator rod retainer having a through-bore, the stator rode retainer being in mechanical communication with at least one bearing. The system also includes a stator rod having a first portion rigidly attached to the encoder stator and having a second portion disposed within the through-bore of the stator rod retainer. The system also includes a second rotary encoder rigidly attached to a portion of a vehicle associated with the wheel, wherein the encoder is adapted to measure a stator angle based on an angle of the stator rod and to adjust at least one value associated with a wheel speed of the wheel based on the stator angle.

Another aspect of the disclosed embodiments is a wheel force transducer stator angle correction apparatus. The apparatus includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer, the first portion of the stator rod is adapted to move with the encoder stator when the wheel is steered and wherein the second portion of the stator rod rotates the stator rod retainer when the wheel is steered. The apparatus also includes an encoder rigidly attached to a portion of a vehicle associated with the wheel, wherein the encoder is adapted to determine a stator angle based on an angle of the stator rod retainer relative to the encoder and to adjust at least one value associated with a wheel rotational position of the wheel based on the measured angle of the stator rod.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
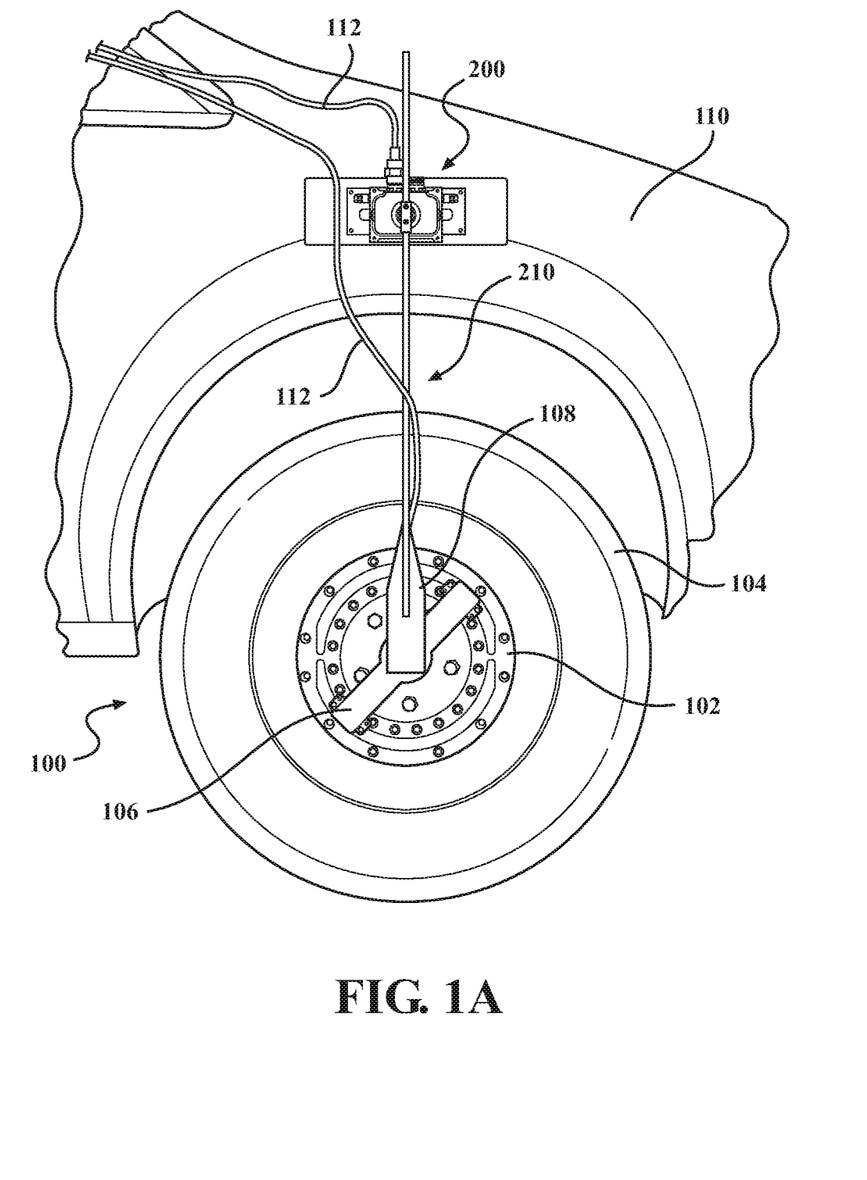
FIG. 1A is a front view of a wheel force transducer according to the principles of the present disclosure.
Figures 2A, 2B:
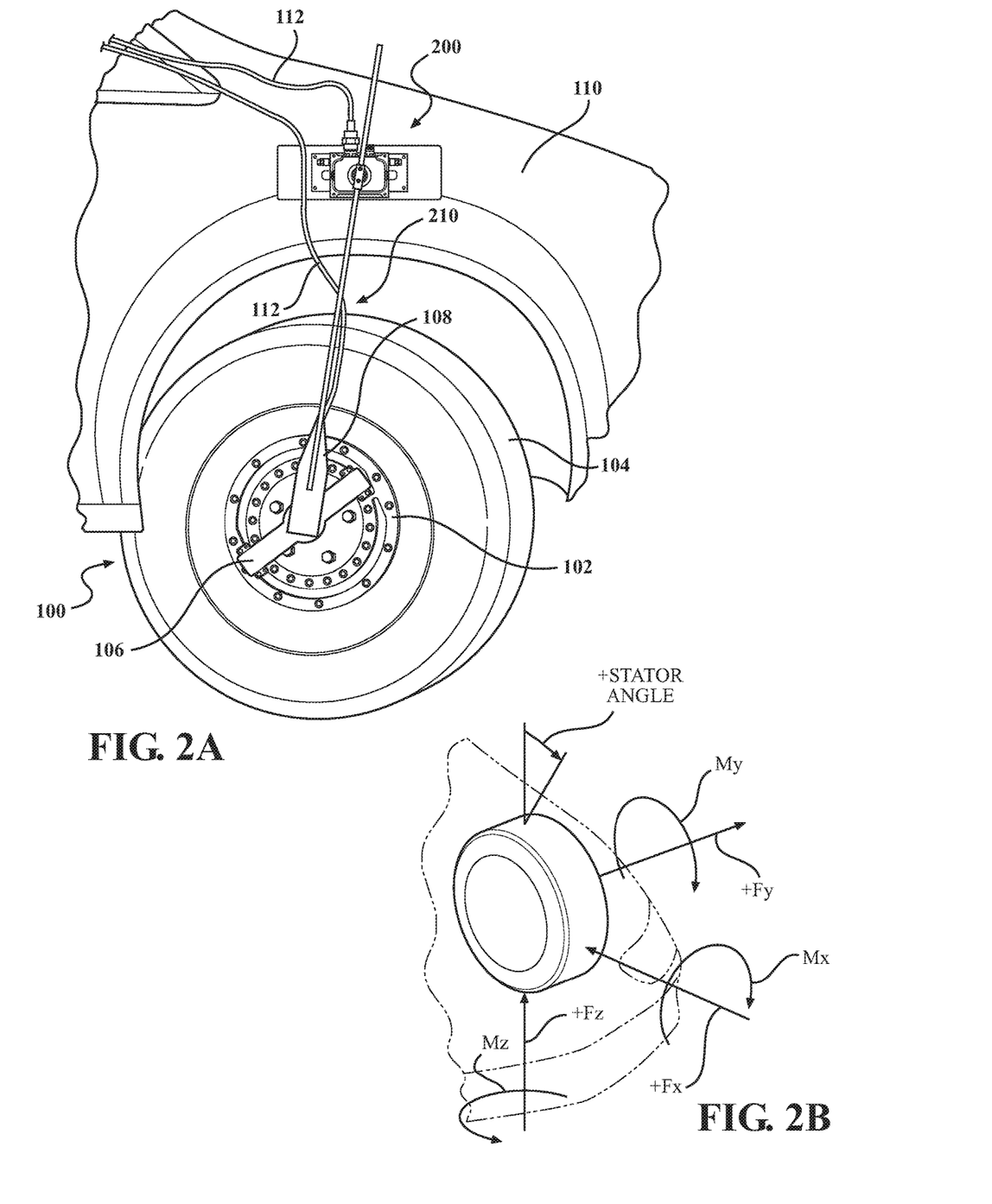
FIG. 2A is an alternate view of a wheel force transducer of FIG. 1.
FIG. 2B generally illustrates a vehicle coordinate system according to the principles of the present disclosure.
Figure 3:
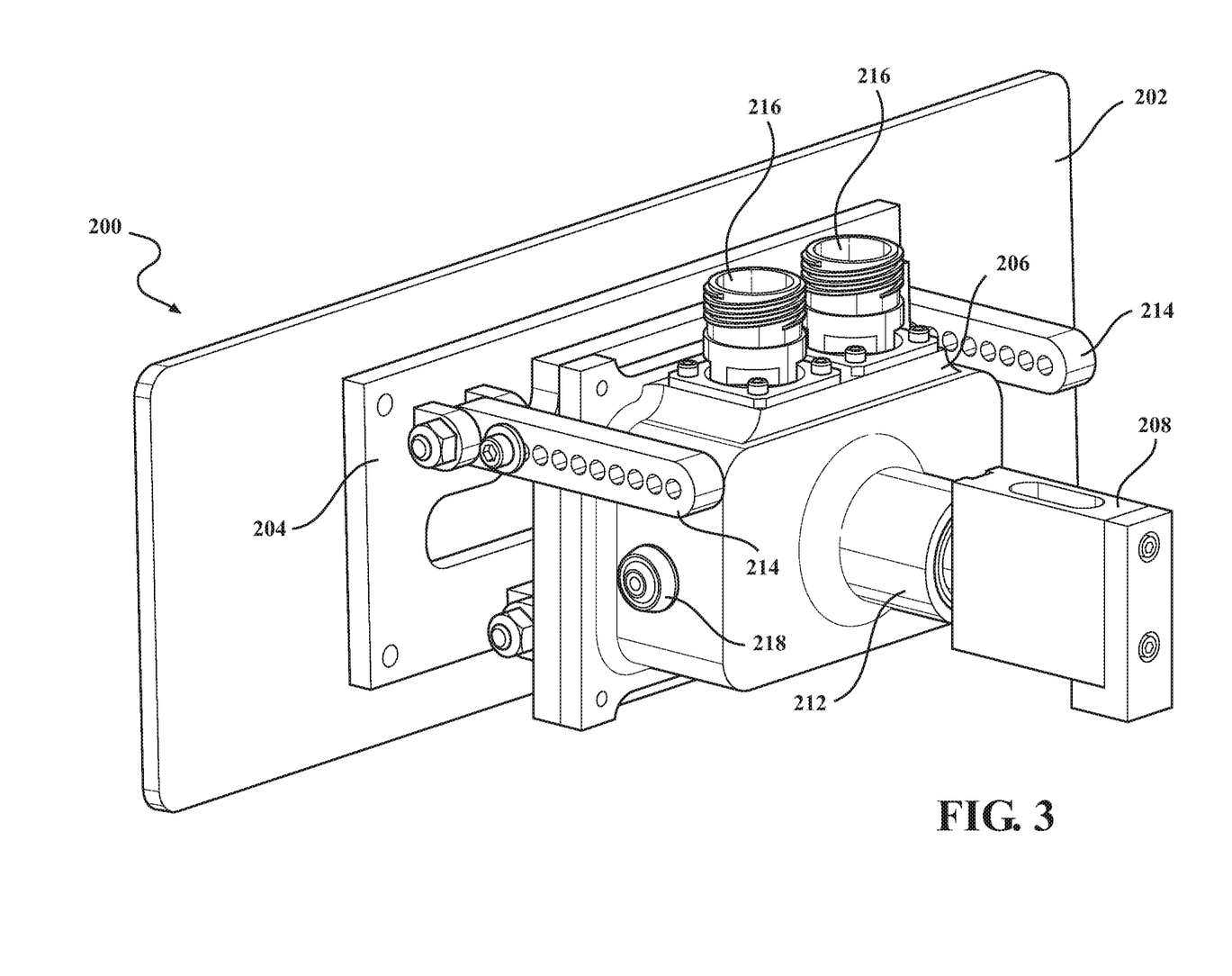
FIG. 3 is a perspective view of a wheel force transducer stator angle correction module according to the principles of the present disclosure.
Figure 4:
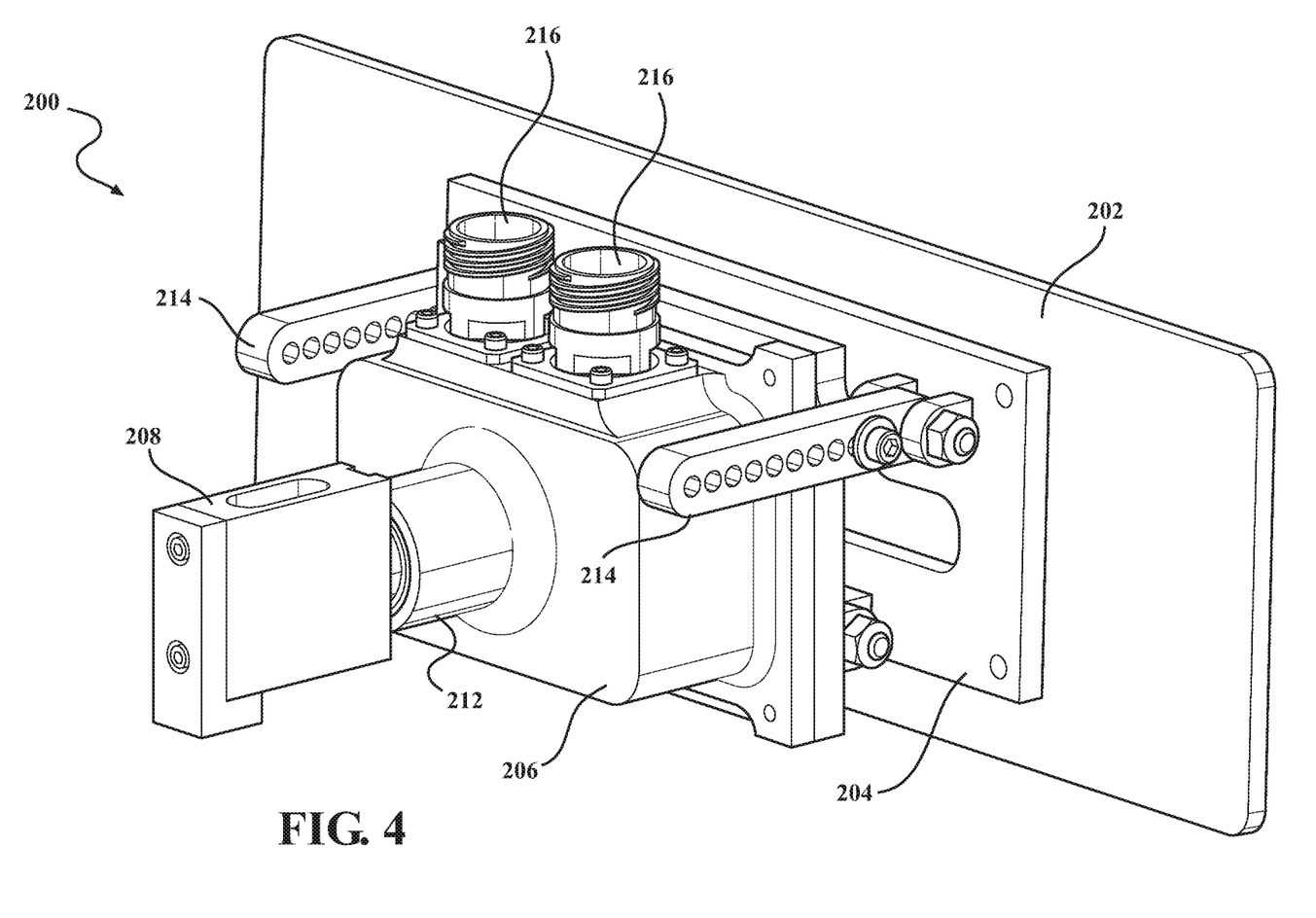
FIG. 4 is a perspective view of the wheel force transducer stator angle correction module of FIG. 3.
Figure 5:
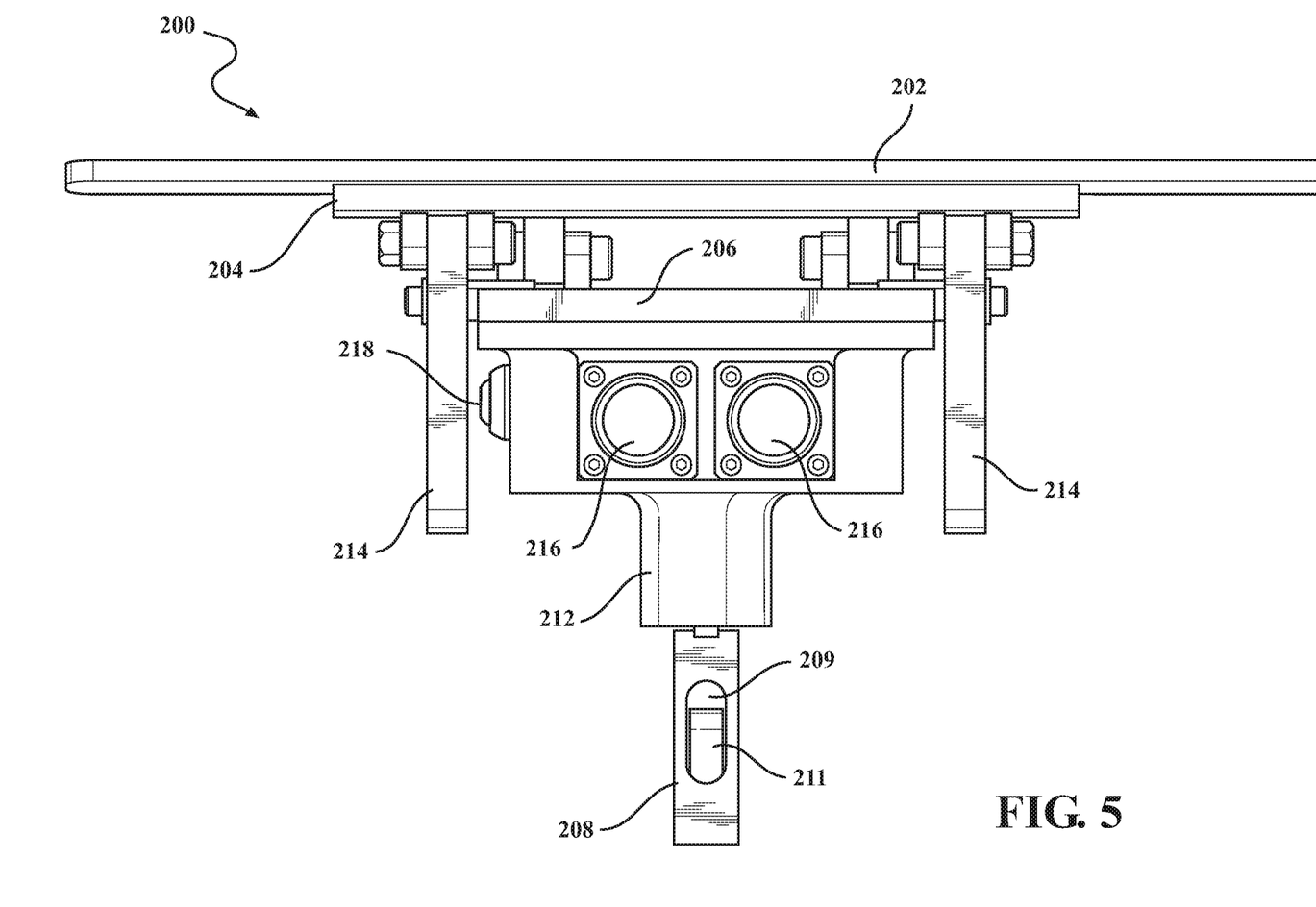
FIG. 5 is a top view of the wheel force transducer stator angle correction module of FIG. 3.
Figure 6:
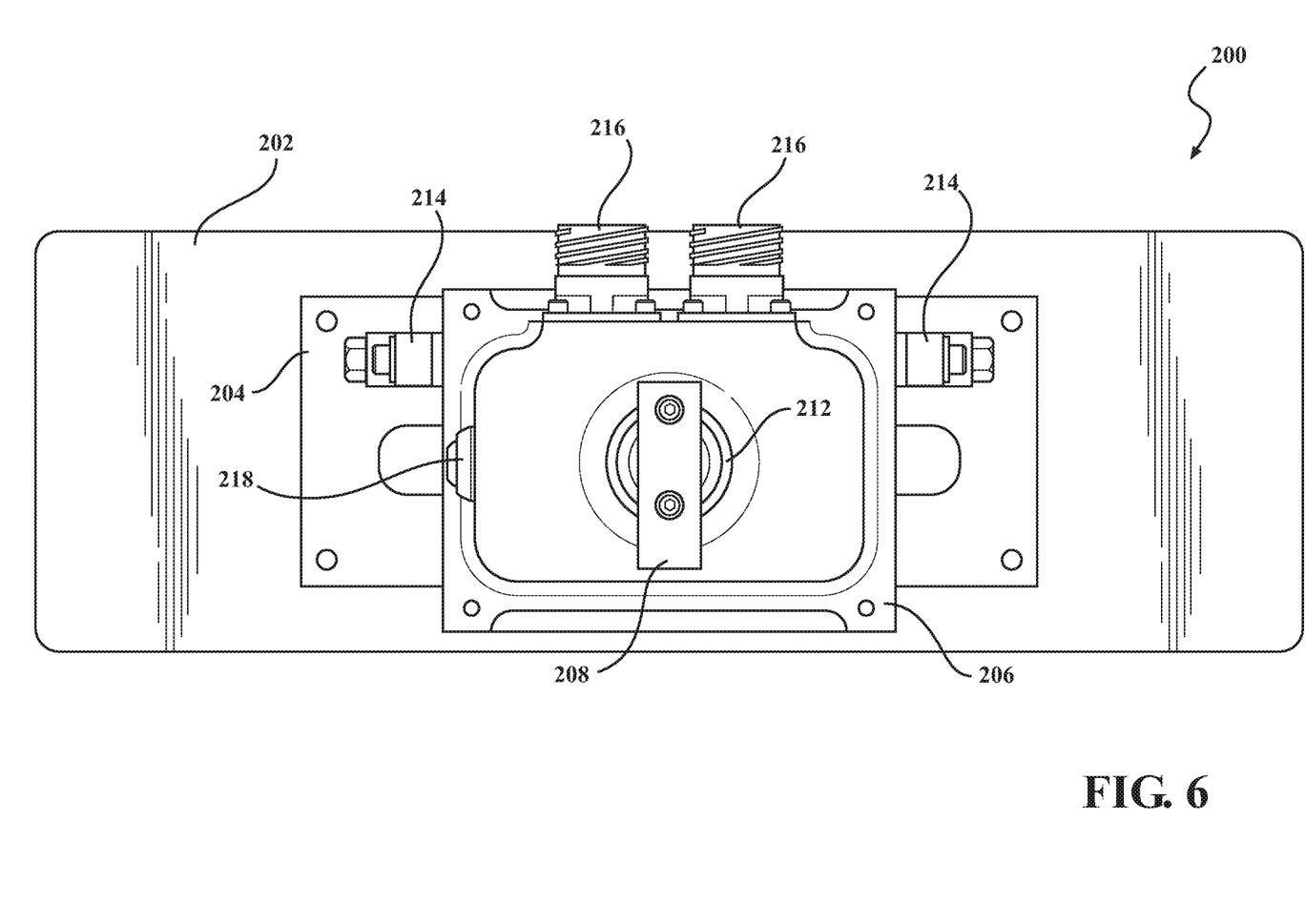
FIG. 6 is a front view of the wheel force transducer stator angle correction module of FIG. 3.
Figure 7:
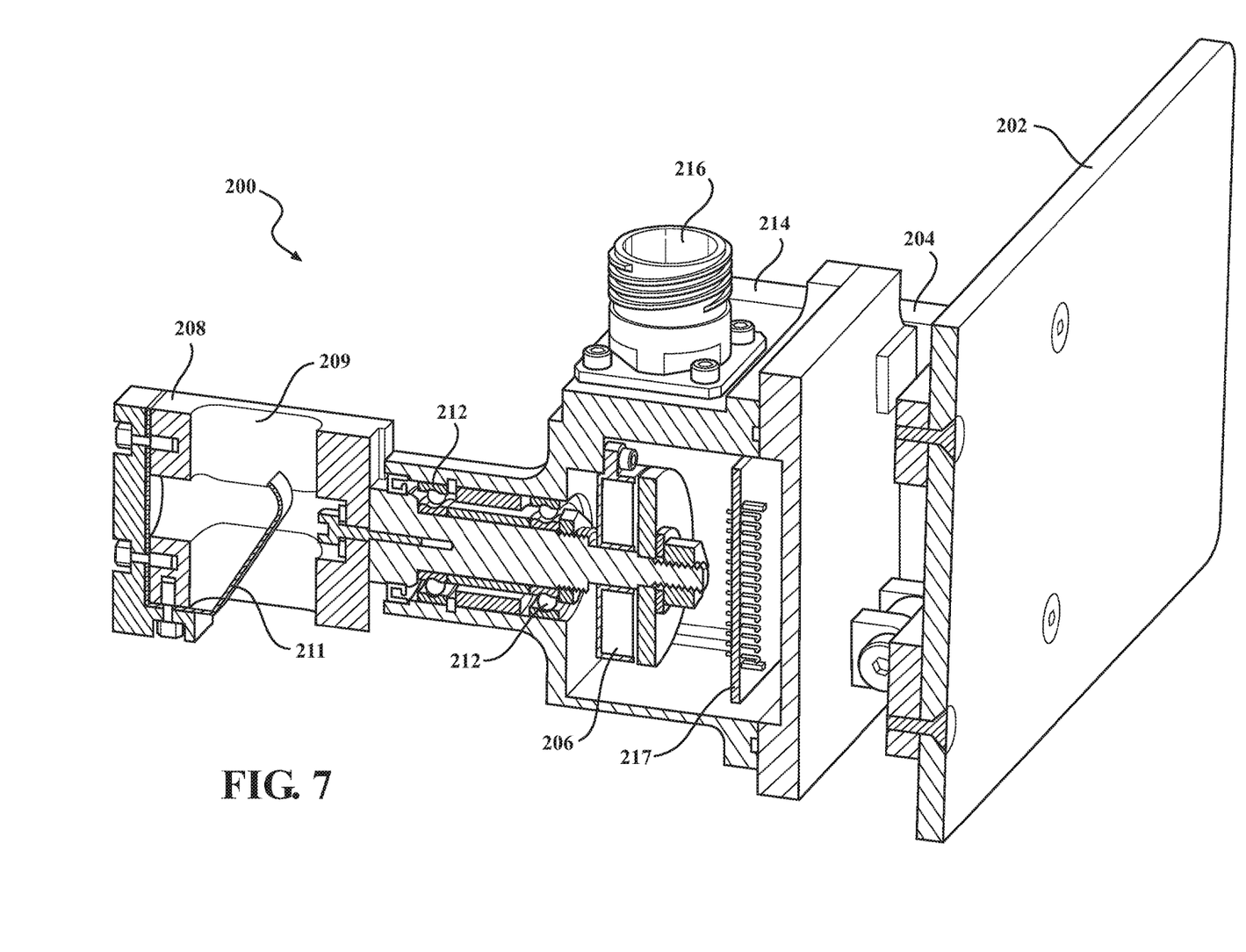
FIG. 7 is a cutaway view of the wheel force transducer stator angle correction module of FIG. 3.

As described, wheel force transducers (WFT), together with appropriate instrumentation, are used to measure forces or loads imparted on an associate rotatable member, such as a vehicle wheel, by the road during vehicle durability testing. FIGS. 1A and 2A generally illustrate a WFT system 100 according to the principles of the present disclosure. The WFT system 100 includes a load transducer 102 (e.g., a wheel force transducer). The load transducer 102 can be a 6-axis rotating transducer, or other suitable load transducer. The load transducer 102 may comprise an annular profile and be attached to an associated rotatable member or wheel 104 by any suitable means. The load transducer 102 includes a plurality of sensors. The plurality of sensors may include strain gages or other suitable sensors. The plurality of sensors are adapted to measure one or more forces or loads acting on the wheel 104, one or more moments associated with the wheel 104, and/or other suitable measurements associated with the wheel 104. In some embodiments, during vehicle durability testing, the plurality of sensors measure three primary forces acting on the wheel 104 (e.g., downward force, longitudinal force, and lateral force) and three primary corresponding moments of the wheel 104. In some embodiments, the one or more sensors may communicate an output signal corresponding to the one or more measured forces or loads acting on the wheel 104 to a controller, as will be described.

The WFT system 100 includes a rotary encoder 106. The rotary encoder is a rotational measurement device. The rotary encode 106 includes a rotor (rotating portion that rotates with the wheel 104) and an encoder stator 108 (or encoder stator 108), which is a non-rotating, or stationary, part that is fixed to the vehicle body or, as will be described, to a stator angle correction module. The rotary encoder 106 may be referred to as the first rotary encoder 106. The rotary encoder 106 may include a high resolution rotary position encoder, or other suitable device. The rotary encoder 106 is disposed on an outer portion of the load transducer 102, such that, the rotary encoder 106, or a rotor associated with the rotary encoder 106, rotates with the load transducer 102 and the wheel 104. The encoder stator 108 can be attached to one or more fixtures. The encoder stator 108 and attached fixtures will be referred to as encoder stator 108. A first portion of the encoder stator 108 may be rigidly coupled or attached to a portion of the wheel 104, the rotary encoder 106, or the load transducer 102 using, for example, a bracket that allows a position of the encoder stator 108 to remain substantially stationary during vehicle durability testing (e.g., while the wheel 104, and consequently, the load transducer 102 and the rotary encoder 106, rotates). In some embodiments, a second portion of the encoder stator 108 may be coupled or attached to a portion of a vehicle 110, such as a portion of the body of the vehicle 110. In some embodiments, the encoder stator 108 may be coupled or attached to a bracket that extends over the wheel 104 and rigidly mounts to a steering knuckle or other part of a suspension of the vehicle 110.

The rotary encoder 106 is adapted to rotate with the rotation of the wheel 104. The rotary encoder 106 may include one or more sensors. The one or more sensors may include rotational position sensors or other suitable sensors. In some embodiments, at least one of the one or more sensors is adapted to measure a rotational position between the at least one sensor and the encoder stator 108. For example, as the wheel 104, and consequently, the rotary encoder 106 or a rotor associated with the rotary encoder 106, rotates, the at least one sensor passes the stationary position of the encoder stator 108. The at least one sensor is adapted to measure a current position of the at least one sensor relative to the encoder stator 108. The rotary encoder 106 is adapted to generate an analog or digital signal corresponding to the measured current position. The rotary encoder 106 communicates the signal corresponding to the current position to the controller. In some embodiments, the at least one sensor is adapted to continuously measure positions of the at least one sensor relative to the encoder stator 108. The rotary encoder 106 may communicate signals corresponding to respective current positions on demand, continuously, or at other suitable periods to the controller.

In some embodiments, the at least one sensor is adapted to capture, measure, or record a timestamp when the at least one sensor passes the stationary position of the encoder stator 108. The at least one sensor may be adapted to capture, measure, or record a timestamp for each measured position of the at least one sensor relative to the stationary position of the encoder stator 108. The rotary encoder 106, as described, is adapted to generate analog or digital signals corresponding to respective timestamps. The rotary encoder 106 is adapted to communicate the signals corresponding to respective captured, measured, or recorded timestamps to the controller. In some embodiments, the rotary encoder 106 is adapted to directly measure one or more wheel speeds of the wheel 104 and one or more rotational positions of the wheel 104 using the position of encoder stator 108. The encoder generates signals corresponding to respective wheel speeds of the wheel 104 and respective rotational positions of the wheel 104. The rotary encoder 106 may communicate the signals to the controller.

As described, the WFT system 100 may include a User Interface controller. The controller may be any suitable computing device that includes a processor, memory, and/or other suitable computing components. The controller is configured to receive, as described, the signals corresponding to the one or more measured forces or loads acting on the wheel 104 from the load transducer 102, the signals corresponding to measured positions of the rotary encoder 106 relative to the encoder stator 108, the signals corresponding to respective timestamps from the rotary encoder 106, other suitable signals, or a combination thereof. The load transducer 102 and the rotary encoder 106 may communicate signals to the controller using any suitable technique. For example, the WFT system 100 may include one or more communications cables 112 connected to the load transducer 102, the rotary encoder 106, or both and to the controller, such that, signals and other data may be passed from the load transducer 102 and the rotary encoder 106 to the controller.

The User Interface controller is adapted to determine one or more rotary positions of the wheel 104, one or more wheel speeds of the wheel 104, and/or other suitable characteristics of the wheel 104 based on the signals corresponding to the current positions of the rotary encoder 106 relative to the encoder stator 108 and the signals corresponding to the respective timestamps. Additionally, or alternatively, the controller is adapted to perform coordinate transformation on the forces or loads acting on the wheel 104 based on the signals received from the load transducer 102. For example, the controller receives signals corresponding to the three primary forces acting on the wheel 104 and signals corresponding to the three moments corresponding to the three primary forces, as described. In some embodiments, the controller receives signals corresponding to the wheel speeds of the wheel 104 and the rotational positions of the wheel 104.

Figure 1B:
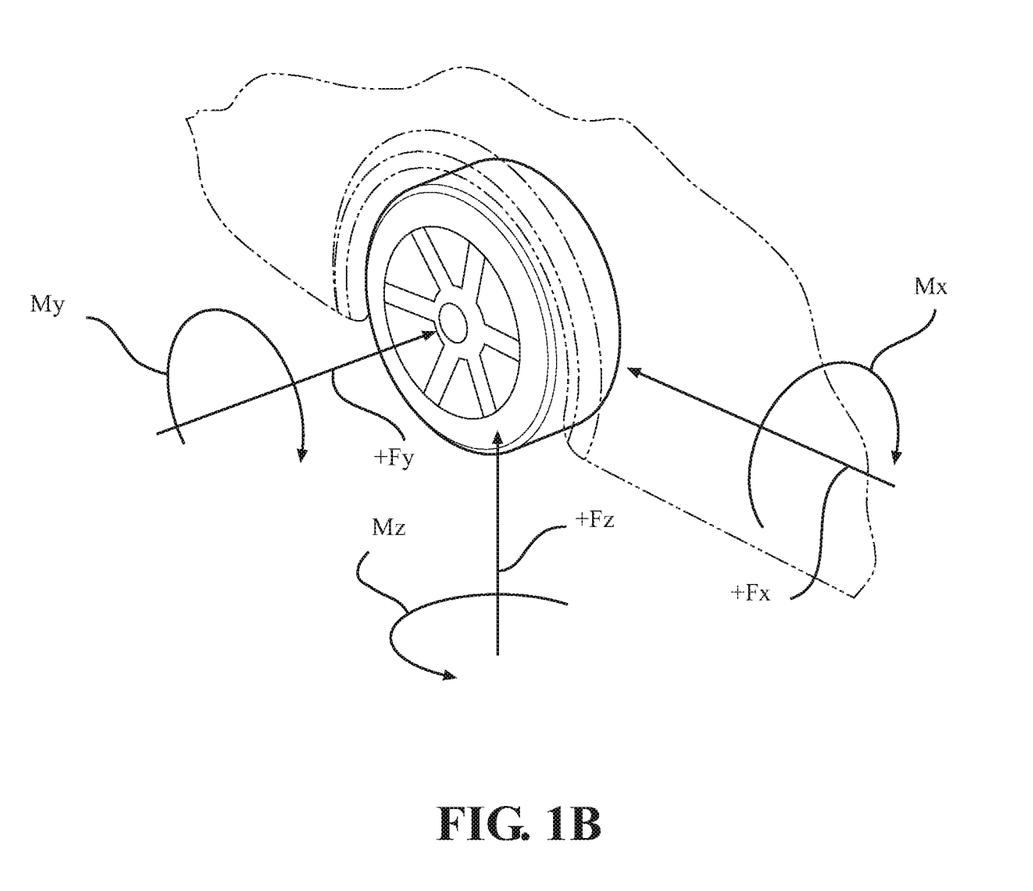
FIG. 1B generally illustrates a vehicle coordinate system according to the principles of the present disclosure.

The User Interface controller performs the coordinate transformation in order to organize the forces acting on the wheel 104 in an x, y, and z coordinate system, which may be referred to as a vehicle coordinate system, as is generally illustrated in FIG. 1B. The vehicle coordinate system may include a force in the 'y' direction ("Fy") and a corresponding moment ("My"), a force in the 'x' direction ("Fx") and a corresponding moment ("Mx"), and a force in the 'z' direction ("Fz") and a corresponding moment ("Mz").

In some embodiments, the User Interface controller may communicate the vehicle coordinate system, values associated with the forces and moments acting on the wheel 104, values associated with the one or more rotary wheel positions associated with the wheel 104, the one or more wheel speeds of the wheel 104, other characteristics of the wheel 104, or a combination thereof to data recorder. The User Interface controller may be implemented on a computing device, such as a laptop computer, a desktop computer, a mobile computing device (e.g., a smartphone or tablet), other suitable computing device, or a combination thereof. The WFT system 100 is adapted to allow a user to review and analyze forces and moments acting on the wheel 104. The analysis of the forces and moments acting on the wheel 104 may be used to analyze durability of various components of the vehicle 110.

As described, the encoder stator 108 is the non-rotating portion of the rotary encoder 106. The rotating portion of the rotary encoder 106 is rigidly attached to a portion of the load transducer 102, or the wheel 104. A second portion of the encoder stator 108 may be rigidly coupled or attached to a portion of the body of the vehicle 110 or a portion of the suspension of the vehicle 110. By rigidly positioning the encoder stator 108, the encoder stator 108 remains substantially stationary during vehicle durability testing, which allows the rotary encoder 106 to use the encoder stator 108 as a reference point for the above described measurements. For example, the encoder stator 108 may be positioned substantially parallel to the z-axis of the vehicle coordinate system (e.g., the encoder stator 108 may be vertically positioned). However, during vehicle durability testing, the encoder stator 108 may tip relative to the z-axis (e.g., become non-vertical). For example, when the wheel 104 is steered, the wheel 104 travels in an arcuate direction, which may cause the encoder stator 108 to tip from the vertical position. FIG. 2B generally illustrates a stator angle relative to the vertical position created when the encoder stator 108 is tipped and becomes non-vertical. Because the force and moment determinations, described above, assume the encoder stator 108 is statically disposed in the z-axis direction (e.g. vertically disposed), the forces and moments determined by the controller may be inaccurate. Additionally, or alternatively, the forces and moments organized in the vehicle coordinate system may be inaccurately represented.

In some embodiments, the WFT system 100 includes a wheel force transducer stator angle correction module 200 ("SAC module 200"). The SAC module 200 may be referred to as a wheel force transducer steering angle compensator ("WFT SAC"). The SAC module 200 may be referred to as a SAC apparatus 200 or a SAC device 200. The SAC module 200 is adapted to measure an angle of the encoder stator 108 during vehicle durability testing. In some embodiments, the SAC module 200 intercepts the signals corresponding to the forces and moments communicated by the load transducer 102 before the signals reach the User Interface controller. The SAC module 200, as will be described, adjusts the signals corresponding to the wheel speed and wheel rotational position from rotary encoder 106 based on the measured angle of the encoder stator 108. The correction of the wheel rotational position signal before coordinate transformation in the User Interface controller prevents inaccuracy or inaccurate representation of the forces and moments as the encoder stator 108 becomes non-vertical when the wheels of the vehicle are steered. The in-line adjustment of the wheel rotational position signal inside the SAC module 200 corrects the rotary encoder 106 signal such that it stays substantially vertical throughout the vehicle durability testing, preventing inaccuracy or inaccurate representation of the forces and moments. For example, the SAC module 200 may adjust the wheel speed and wheel rotational position, described above, according to the following:

$$\text{Wheel Rotation Position(adjusted)} = \text{Wheel rotation position} + \text{Stator angle} * M \quad \text{EQ. 1}$$

$$\text{Wheel Speed (adjusted)} = \text{Wheel Speed} + \text{Stator Speed} \quad \text{EQ. 2}$$

With respect to EQ. 1, wheel rotation position is the rotation position of the wheel 104 as measured by rotary encoder 106. Stator angle is the change in the angle of the encoder stator 108 as measured in SAC module 200. M is a factor that may be used to adjust the stator angle to account for out of plane wheel travel with respect to stator angle. Wheel rotational position(adjusted) is the adjusted rotation angle of the wheel 104 as output from SAC module 200. With respect to EQ. 2, wheel speed is the rotation speed of the wheel 104 as measured by rotary encoder 106. Stator speed is the change in speed of the encoder stator 108 as measured in SAC module 200. Wheel speed (adjusted) is the adjusted rotation speed of the wheel 104 as output from SAC module 200.

FIGS. 3-7 generally illustrate the SAC module 200. The SAC module 200 includes a vehicle mount 202. The vehicle mount 202 is adapted to rigidly connect or attach the SAC module 200 to a portion of the vehicle 110. For example, the vehicle mount 202 is adapted to rigidly attach the SAC module 200 to a fender of the vehicle 110. The vehicle mount 202 may connect or attach the SAC module 200 using any suitable technique. For example, the vehicle mount 202 may include a temporary or permanent adhesive that engages the portion of the vehicle 110 and rigidly connects or attaches the SAC module 200 to the portion of the vehicle 110. In some embodiments, the vehicle mount 202 may be mechanically secured to the portion of the vehicle 110. For example, the vehicle mount 202 may be riveted, screwed, bolted, or mechanically secured to the portion of the vehicle 110 using other suitable techniques. In some embodiments, the vehicle mount 202 may comprise a magnet or magnetic material adapted to secure the SAC module 200 to the vehicle using magnetic forces.

The SAC module 200 includes a mounting bracket 204. The mounting bracket 204 is adapted to rigidly mount components of the SAC module 200 to the vehicle mount 202, using any suitable technique. For example, the mounting bracket 204 may be mechanically secured to the vehicle mount 202, as described above.

The SAC module 200 includes a rotary encoder 206 and a stator rod retainer 208. The stator rod retainer 208 is adapted to receive a portion of a stator rod 210, as is generally illustrated in FIGS. 1A and 2A. A first portion of the stator rod 210 is adapted to be rigidly connected or attached to a portion of the encoder stator 108. A second portion of the stator rod 210 is adapted to be received in a through-bore 209 of the stator rod retainer 208. In some embodiments, the stator rod retainer 208 includes a cantilever sheet metal spring 211 disposed within the through-bore 209. The cantilever sheet metal spring 211 is adapted to limit or control movement of the stator rod 210 in the through-bore 209. During vehicle durability testing, the first portion of the stator rod 210 remains rigidly connected or attached to the encoder stator 108 and the second portion of the stator rod 210 moves substantially freely through the through-bore 209 of the stator rod retainer 208. For example, when the wheel 104 is steered, the first portion of the stator rod 210 moves with the encoder stator 108. A distance between the encoder stator 108 and the stator rod retainer 208 increases as the wheel 104 is steered. Accordingly, the second portion of the stator rod 210 moves within the through-bore 209 of the stator rod retainer 208 to accommodate the change in distance between the encoder stator 108 and the stator rod retainer 208.

The stator rod retainer 208 is adapted to rotate with respect to the rotary encoder 206. For example, the stator rod retainer 208 may be mechanically coupled to one or more bearings 212. The bearings 212 are disposed on a portion of the rotary encoder 206. The bearings 212 may include any suitable bearings. The bearings 212 allow the stator rod retainer 208 to rotate with respect to the stationary portion of the rotary encoder 206. As described, the first portion of the stator rod 210 moves with the encoder stator 108 when the wheel 104 is steered. As the wheel 104 is steered, the second portion of the stator rod 210 moves within the through-bore 209 of the stator rod retainer 208. As the stator rod 210 moves within the through-bore 209 of the stator rod retainer 208, the stator rod retainer 208 rotates on the bearings 212 with respect to the rotary encoder 206. The movement of the stator rod retainer 208 corresponds to the angular movement of the encoder stator 108 resulting from the wheel 104 being steered. Accordingly, the angle of the stator rod retainer 208 with respect to the rotary encoder 206 corresponds to the stator angle of the encoder stator 108, described above.

The rotary encoder 206 is adapted to measure the angle of the stator rod retainer 208, as described. The rotary encoder 206 may be referred to as a second encoder. The rotary encoder 206 may include a high resolution rotary encoder or other suitable rotation measurement devices. The rotary encoder 206 may be connected or attached to the mounting bracket 204 using various brackets or other suitable mechanisms. A position of the rotary encoder 206 relative to the vehicle 110 may be adjustable. For example, the rotary encoder 206 may be connected or attached to the mounting bracket 204 using one or more adjustable brackets 214. The SAC module 200 includes a controller 217. The controller 217 may include any suitable controller, as described. The controller 217 may intercept the signals corresponding to the forces and moments acting on the wheel 104 from the load transducer 102. Additionally, or alternatively, the controller 217 may intercept the wheel speed and wheel rotational position from the first rotary encoder 106. The controller 217 may then adjust the wheel speed and wheel rotational position signals while not modifying the force and moment signals. For example, the SAC module 200 includes one or more communications ports 216. A communications cable, as described, may connect one of the communications ports 216 to the load transducer 102. The controller 217 adjusts the values of the wheel speed and wheel rotation position signals using the above described equations (e.g., using the stator angle). The controller 217 generates signals corresponding to the adjusted wheel speed and wheel rotational position as of the wheel 104. The controller 217 communicates the signals to the User Interface controller, as described. For example, a communications cable, as described, may connect another of the communications ports 216 to the User Interface controller. In some embodiments, the controller 217 generates a signal corresponding to the measured stator angle. The controller 217 communicates the measured signal to the User Interface controller. In some embodiments, the User Interface controller may be adapted to adjust the force values and the moment values using the measured stator angle corresponding to the signal communicated by the controller 217.

In some embodiments, the SAC module 200 includes a relative position mechanism 218. The relative position mechanism 218 may include a button or other actuating device for activating the relative position mechanism 218. The relative position mechanism 218, when activated, adjusts the rotary encoder 206 to account for a current position of the stator rod retainer 208 (e.g., to zero-out the rotary encoder 206).

As described, the User Interface may use the adjusted wheel speeds, and the adjusted wheel rotational positions to perform the coordinate transformation. The User Interface controller may communicate the forces, the moments, the adjusted wheel speeds, the adjusted rotational positions, and the adjusted vehicle coordinate system resulting from the coordinate transformation to a data recorder.

Figure 8:
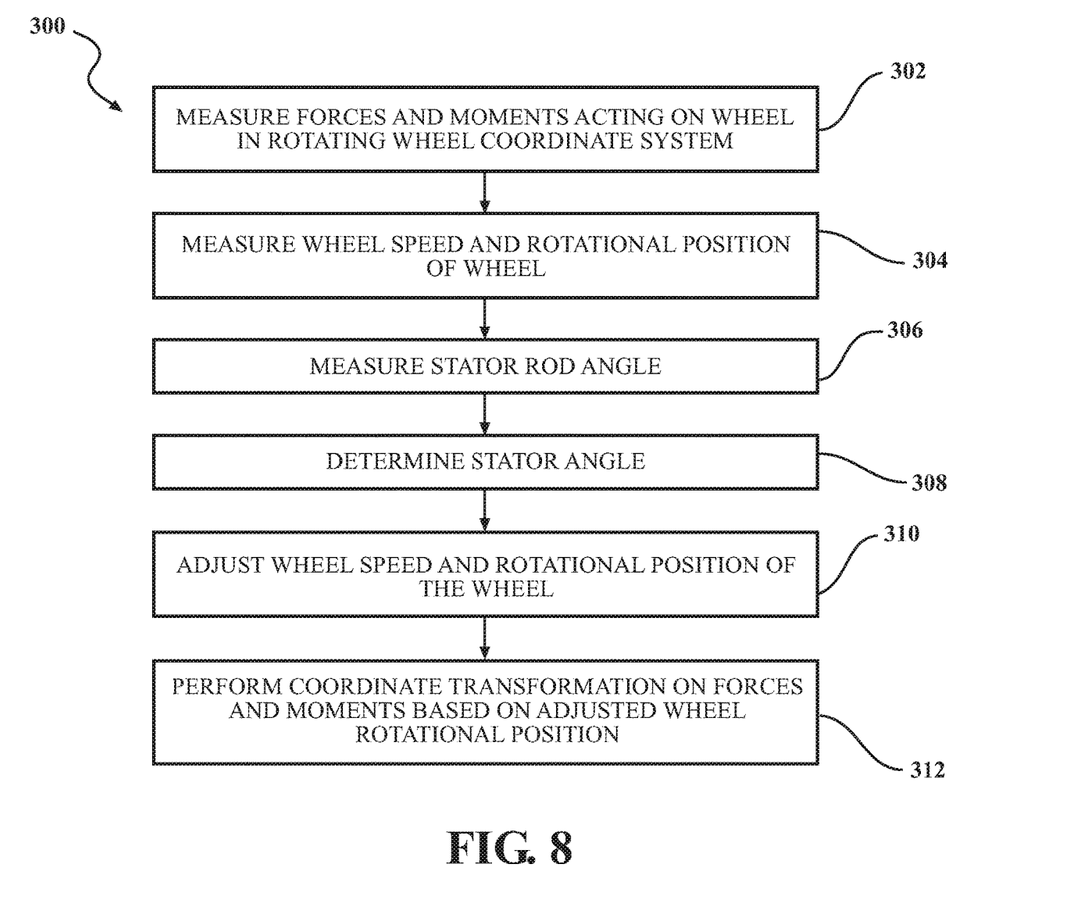
FIG. 8 is a flow diagram illustrating a wheel force transducer stator angle correction method according to the principles of the present disclosure.

FIG. 8 is a flow diagram illustrating a wheel force transducer stator angle correction method 300 according to the principles of the present disclosure. At 302, the method 300 measures forces and moments acting on a wheel, such as the wheel 104 in a rotating wheel coordinate system. As described, the load transducer 102 determines three primary forces acting on the wheel 104 and three primary moments corresponding to the three primary forces acting on the wheel 104. The load transducer 102 may generate signals corresponding to the forces and moments acting on the wheel 104. The load transducer 102 communicates the signals to the User Interface controller. At 304, the method 300 measures wheel speed and wheel rotational position of the wheel 104. For example, as described, the rotary encoder 106, using the encoder stator 108, determines one or more wheel speeds of the wheel 104 and one or more rotational positions of the wheel 104. The rotary encoder 106 generates signals corresponding to respective wheel speeds of the wheel 104 and respective rotational positions of the wheel 104. The rotary encoder 106 may communicate the signals to the User Interface controller, as described.

At 306, the method 300 measures a stator rod angle. As described, the SAC module 200 measures an angle of the stator rod 210 (e.g., as the wheel 104 is steered during vehicle durability testing). At 308, the method 300 determines a stator angle. As described, the stator angle corresponds to the measured angle of the stator rod 210. At 310, the method 300 adjusts wheel speed and wheel rotational position signal while allowing signals corresponding to the force and moment acting on the wheel to pass through to the User Interface controller unmodified. For example, as described, the SAC module 200 intercepts the signals corresponding to the forces and moments acting on the wheel 104 as well as the wheel speed and wheel rotational position of the wheel 104. The SAC module 200 adjusts the values of wheel speed and wheel rotational position using the stator angle. The SAC module 200 generates signals corresponding to the adjusted values of the wheel speed and wheel rotational position and well as the unmodified signals for the forces and moments acting on the wheel 104. The SAC module 200 communicates the signals to the User Interface controller, as described. In some embodiments, the SAC module 200 communicates a signal corresponding to the stator angle to the User Interface controller. At 312, the method 300 performs coordinate transformation on the forces and moments acting on the wheel 104 using the modified signal for wheel rotational position, as described.

In some embodiments, a wheel force transducer stator angle correction apparatus includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer. The apparatus also includes an encoder rigidly attached to a portion of a vehicle associated with the wheel, wherein the encoder is adapted to measure an angle of the stator rod and to adjust at least one value associated with a wheel speed of the wheel based on the measured angle of the stator rod.

In some embodiments the encoder is adapted to adjust a value associated with a wheel rotational position of the wheel based on the measured angle of the stator rod. In some embodiments, the encoder is adapted to intercept signals corresponding to three primary forces acting on the wheel. In some embodiments, the encoder is adapted to intercept the at least one value associated with the wheel speed of the wheel. In some embodiments, the encoder is adapted to communicate a signal corresponding to the adjusted value associated with the wheel speed of the wheel and signals corresponding to the three primary force acting on the wheel to a user interface. In some embodiments, the apparatus includes a relative position mechanism adapted to zero-out the encoder. In some embodiments, the stator rod retainer is adapted to rotate relative to the encoder. In some embodiments, the encoder is in mechanical communication with a magnetic mount that rigidly attaches the encoder to the portion of the vehicle.

In some embodiments, a wheel force transducer stator angle correction system includes a load transducer adapted to measure at least one force acting on a corresponding wheel. The system also includes an encoder stator substantially vertically positioned and rigidly disposed proximate the load transducer. The system also includes a first rotary encoder rotatably attached to the wheel and adapted to measure at least one rotational position of the wheel using the encoder stator. The system also includes a stator rod retainer having a through-bore, the stator rode retainer being in mechanical communication with at least one bearing. The system also includes a stator rod having a first portion rigidly attached to the encoder stator and having a second portion disposed within the through-bore of the stator rod retainer. The system also includes a second rotary encoder rigidly attached to a portion of a vehicle associated with the wheel, wherein the encoder is adapted to measure a stator angle based on an angle of the stator rod and to adjust at least one value associated with a wheel speed of the wheel based on the stator angle.

In some embodiments, the second encoder is adapted to adjust a value associated with a wheel rotational position of the wheel based on the measured angle of the stator rod. In some embodiments, the second encoder is adapted to intercept signals corresponding to three primary forces acting on the wheel. In some embodiments, the second encoder is adapted to intercept the at least one value associated with the wheel speed of the wheel. In some embodiments, the system also includes a relative position mechanism adapted to zero-out the encoder. In some embodiments, the stator rod retainer is adapted to rotate relative to the second encoder. In some embodiments, the second encoder communicate a signal corresponding to the adjusted value associated with the wheel speed of the wheel to a user interface. In some embodiments, the second encoder is adapted to adjust at least one value associated with the rotational position of the wheel based on the stator angle.

In some embodiments, a wheel force transducer stator angle correction apparatus, includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer, the first portion of the stator rod is adapted to move with the encoder stator when the wheel is steered and wherein the second portion of the stator rod rotates the stator rod retainer when the wheel is steered. The apparatus also includes an encoder rigidly attached to a portion of a vehicle associated with the wheel, wherein the encoder is adapted to determine a stator angle based on an angle of the stator rod retainer relative to the encoder and to adjust at least one value associated with a wheel rotational position of the wheel based on the measured angle of the stator rod.

In some embodiments, the encoder is adapted to adjust a value associated with a wheel rotational position of the wheel based on the measured angle of the stator rod. In some embodiments, the apparatus also includes a relative position mechanism adapted to zero-out the encoder. In some embodiments, the stator rod retainer is adapted to rotate relative to the encoder.

As described above, it should be noted that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of apparatuses as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination. The terms "signal" and "data" are used interchangeably. Further, portions of the apparatuses do not necessarily have to be implemented in the same manner.

The aspects of the disclosure described herein can be described in terms of functional block components and various processing operations. The disclosed processes and sequences can be performed individually or in any combination. Functional blocks can be realized by any number of hardware and/or software components that perform the specified functions. For example, the described aspects can employ various integrated circuit components (e.g., memory elements, processing elements, logic elements, look-up tables, and the like), which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device, such as a hard disk drive, a memory device, a solid-state drive, a flash drive, or an optical drive. Other suitable mediums are also available. Such computer-usable or computer-readable media can be referred to as non-transitory memory or media. Unless otherwise specified, a memory of an apparatus described herein does not have to be physically contained in the apparatus, but can be a memory that can be accessed remotely by the apparatus, and does not have to be contiguous with other memory that might be physically contained by the apparatus.

Any of the individual or combined functions described herein as being performed as examples of the disclosure can be implemented using machine-readable instructions in the form of code for the operation of any or any combination of the aforementioned computational hardware. The computational code can be implemented in the form of one or more modules by which individual or combined functions can be performed as a computational tool, the input and output data of each module being passed to/from one or more further modules during operation of the methods, apparatuses, and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, electronics, control systems, software development, and other functional aspects of the systems (and components of the individual operating components of the systems) cannot be described in detail herein. Furthermore, the connecting lines or connectors shown in the various figures presented are intended to represent exemplary functional relationships and/or physical or logical couplings between the various elements. Many alternative or additional functional relationships, physical connections, or logical connections can be present in a practical device.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A and/or B" is satisfied under any of the foregoing instances. Similarly, "X includes at least one of A, B, and C" is intended to be used as an equivalent of "X includes A, B, and/or C." In addition, the articles "a" and "an" as used in this application and the appended claims should generally be construed to mean "one or more" unless specified otherwise or clear from context to be directed to a singular form. Moreover, use of the term "an aspect" or "one aspect" throughout this disclosure is not intended to mean the same aspect or implementation unless described as such.

The use of "including" or "having" and variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by the context. The use of any and all examples, or exemplary language (e.g., "such as") provided herein, is intended merely to better illuminate the disclosure and does not pose a limitation on the scope of the disclosure unless otherwise claimed. It should be understood that although this disclosure uses terms such as first, second, third, etc., the disclosure should not be limited to these terms. These terms are used only to distinguish similar types of information from each other. For example, without departing from the scope of this disclosure, a first information can also be referred to as a second information; and similarly, a second information can also be referred to as a first information. Depending on the context, the word "if" as used herein can be interpreted as "when," "while," or "in response to."

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A wheel force transducer stator angle correction apparatus, comprising:
    a stator rod retainer having a through-bore, the stator rod retainer being in mechanical communication with at least one bearing;
    a stator rod having a first portion rigidly attached to an encoder stator attached to a wheel and having a second portion disposed within the through-bore of the stator rod retainer; and an encoder rigidly attached to a portion of a vehicle associated with the wheel, wherein the encoder is adapted to measure an angle of the stator rod and to adjust a value associated with a wheel speed of the wheel based on the angle of the stator rod.

2. The apparatus of claim 1, wherein the encoder is adapted to adjust a value associated with a rotational position of the wheel.

3. The apparatus of claim 1, wherein the encoder is adapted to intercept signals corresponding to three primary forces acting on the wheel.

4. The apparatus of claim 3, wherein the encoder is adapted to intercept the value associated with the wheel speed of the wheel.

5. The apparatus of claim 4, wherein the encoder is adapted to communicate, to a user interface, a signal corresponding to the adjusted value associated with the wheel speed of the wheel and signals corresponding to the three primary forces acting on the wheel.

6. The apparatus of claim 1, further comprising a relative position mechanism adapted to zero-out the encoder.

7. The apparatus of claim 1, wherein the stator rod retainer is adapted to rotate relative to the encoder.

8. The apparatus of claim 1, wherein the encoder is in mechanical communication with a magnetic mount that rigidly attaches the encoder to the portion of the vehicle.

9. A wheel force transducer stator angle correction system, comprising:
the wheel force transducer stator angle correction apparatus of claim 1;
a load transducer adapted to measure at least one force acting on the wheel;
the encoder stator substantially vertically positioned and rigidly disposed proximate the load transducer;
a first rotary encoder rotatably attached to the wheel and adapted to measure at least one rotational position of the wheel using the encoder stator; and
the encoder is a second rotary encoder.

10. The system of claim 9, wherein the second rotary encoder is adapted to adjust a value associated with a rotational position of the wheel based on the measured angle of the stator rod.

11. The system of claim 9, wherein the second rotary encoder is adapted to intercept signals corresponding to three primary forces acting on the wheel.

12. The system of claim 11, wherein the second rotary encoder is adapted to intercept the value associated with the wheel speed of the wheel.

13. The system of claim 9, further comprising a relative position mechanism adapted to zero-out the second rotary encoder.

14. The system of claim 9, wherein the stator rod retainer is adapted to rotate relative to the second rotary encoder.

15. The system of claim 9, wherein the second rotary encoder communicates, to a user interface, a signal corresponding to the value associated with the wheel speed of the wheel.

16. The wheel force transducer stator angle correction apparatus of claim 1, wherein:
the first portion of the stator rod is adapted to move with the encoder stator when the wheel is steered;
the second portion of the stator rod rotates the stator rod retainer when the wheel is steered; and
the encoder is adapted to determine the angle based on an angle of the stator rod retainer relative to the encoder.

17. The apparatus of claim 16, wherein the encoder is adapted to adjust a value associated with a rotational position of the wheel.

18. The apparatus of claim 16, further comprising a relative position mechanism adapted to zero-out the encoder.

19. The apparatus of claim 18, wherein the stator rod retainer is adapted to rotate relative to the encoder.

* * * * *